United States Patent
Schröder

(10) Patent No.: US 10,992,195 B2
(45) Date of Patent: Apr. 27, 2021

(54) SYSTEM FOR COOLING AN ELECTRIC MACHINE

(71) Applicant: AUDI AG, Ingolstadt (DE)

(72) Inventor: Maximilian Schröder, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 6 days.

(21) Appl. No.: 16/402,296

(22) Filed: May 3, 2019

(65) Prior Publication Data
US 2019/0372413 A1    Dec. 5, 2019

(30) Foreign Application Priority Data
Jun. 4, 2018  (DE) .......................... 102018208706.7

(51) Int. Cl.
*H02K 1/32* (2006.01)
*H02K 9/06* (2006.01)

(52) U.S. Cl.
CPC ...................... *H02K 1/32* (2013.01)

(58) Field of Classification Search
CPC .. H02K 1/32; H02K 3/24; H02K 9/04; H02K 9/06
USPC ................... 310/58, 59, 61, 62, 63
See application file for complete search history.

(56) References Cited

U.S. PATENT DOCUMENTS

| | | | | |
|---|---|---|---|---|
| 5,866,959 A | * | 2/1999 | Le Flem | H02K 1/20 310/187 |
| 2009/0273246 A1 | * | 11/2009 | Weiss | H02K 1/32 310/61 |
| 2018/0159404 A1 | * | 6/2018 | Frohlich | H02K 1/32 |

FOREIGN PATENT DOCUMENTS

| | | |
|---|---|---|
| DE | 102010013302 A1 | 10/2010 |
| DE | 102010017222 A1 | 12/2011 |
| DE | 102011053787 A1 | 3/2013 |
| EP | 2030308 B1 | 5/2012 |
| FR | 2 829 885 A1 | 3/2003 |
| JP | 200642543 A | 2/2006 |
| WO | 2016/184409 A1 | 11/2016 |

OTHER PUBLICATIONS

"Turbine, n." Merriam-Webster, Jul. 5, 2020. (Year: 2020).*
Examination Report dated Feb. 6, 2019 of corresponding German application No. 102018208706.7; 20 pages.
European Search Report dated Nov. 5, 2019, in connection with corresponding EP Application No. 19172779.1 (13 pgs., including machine-generated English translation).

* cited by examiner

*Primary Examiner* — Thomas Truong
(74) *Attorney, Agent, or Firm* — Maier & Maier, PLLC

(57) ABSTRACT

A system for cooling an electric machine having two components, one of the two components rotor and the other a stator, the two components enclosing a central axis of the electric machine coaxially, The rotor during operation of the electric machine rotates relative to the stator, wherein at least one axially oriented channel passes through at least one component. A fan is arranged at a first end of the at least one channel, wherein a turbine is arranged at a second end of the at least one channel. The fan is designed to enable air to flow, flowing from the first end through the at least one axially oriented channel to the second end.

7 Claims, 2 Drawing Sheets

SYSTEM FOR COOLING AN ELECTRIC MACHINE

FIELD

The invention relates to a system for cooling an electric machine, an electric machine and a method for cooling an electric machine.

BACKGROUND

Cooling of a stator of an electric machine is generally carried out via a water jacket on a housing of the electric machine. Furthermore, heat is dissipated from the rotor, which is especially of importance in the case of rotor critical electric machines, e.g., asynchronous machines and current energized synchronous machines, either by recirculating air cooling or by so-called internal cooling, for example, hollow shaft cooling or lance cooling. A concept for realizing recirculating air cooling comprises a fan mounted on an axial end plate that conveys an exchange of air between a warm axial end of the rotor and colder parts of the housing of the electric machine. Another concept is an axial recirculating air conveyance by a fan which is mounted on an axial end face.

Both concepts described for recirculating air cooling lead to large hydraulic losses within the flowing air, which leads indirectly to a reduction in the efficiency of the electric machine. The same applies to internal cooling of the rotor with water or oil. In a liquid-cooled hollow shaft further significant losses of the power may result in addition to hydraulic losses due to the use of mechanical seals or radial shaft seals. Furthermore, in spite of a good heat transfer to the liquid, internal rotor cooling generates cooling at a place that can be relatively far from a place where heat is generated. A resulting comparatively long way of heat conduction can lead to very high temperatures in active parts of the rotor.

An electric drive arrangement with an electric motor is known from publication DE 10 2010 017 222 A1. In this case, a fan arrangement is arranged on an end face of a housing of the electric motor, by means of which heat losses of the electric motor can be dissipated.

Publication DE 10 2011 053 787 A1 describes a propeller arrangement for generating a fluid flow, which has a drive device with a rotor and a stator.

A method for cooling a stator and a rotor of a bulb turbine generator with a gaseous cooling medium in the bulb turbine generator with a fan driven externally is known from publication EP 2 030 308 B1.

Against this background, it was an object to effectively cool an electric machine.

SUMMARY

This object is achieved by a system, an electric machine and a method having the features of the independent claims. Embodiments of the system, of the electric machine and of the method are evident from the dependent claims.

The system according to the invention is designed for cooling an electric machine having two axially symmetric components in the form of a rotor and a stator, the two components enclosing a central axis of the electric machine coaxially, wherein during operation of the electric machine the rotor rotates relative to the stator. At least one channel which is oriented axially or parallel to and/or along the central axis passes through at least one of the two components. The system has at least one fan and at least one turbine, wherein the at least one fan is arranged at a first end of the at least one channel. The at least one turbine is arranged at a second end of the at least one channel. The at least one fan is designed to enable air to be made to flow. flowing from the first end through the at least one axially oriented channel to the second end. The at least one turbine is designed to convert kinetic energy of the flowing air into rotational energy of the component designed as a rotor.

In an embodiment of the electric machine the inner component which is designed as a rotor encloses a central axial shaft, wherein the rotor as an inner component in turn is axially enclosed by the stator as an outer component. Here, e.g., the at least one axially oriented channel passes through the inner component as a flow channel and/or cooling channel.

In an embodiment the at least one axially oriented channel passes through at least the rotor or only the rotor. Usually, a plurality of axially oriented channels are provided.

The system is usually provided for an electric machine in which the rotor as an inner axial component is enclosed by the stator as an outer axial component. In this case, the rotor as an inner component also axially encloses the central shaft, wherein the rotor typically is connected directly with the central shaft, wherein the central shaft and the rotor during operation of the electric machine rotate relative to the stator about the central axis. Usually, the rotor as an inner component and the central shaft are fastened to each other, wherein the central shaft passes through the rotor centrally. In addition, the at least one turbine is mechanically connected or coupled with the rotor.

Alternatively, it is also possible that the system is provided for an electric machine, in which the stator as an inner component is enclosed axially by the rotor as an outer component. In such an alternative embodiment of the system and the electric machine, the stator as an inner component encloses the central axis, wherein the rotor as an outer component rotates about the stator. However, it is also possible in this case that the at least one turbine and the rotor are mechanically connected or coupled with each other. In this case, the at least one channel, preferably a plurality of channels, pass through the rotor.

It is further provided that the electric machine has permanent magnets and electromagnets as components, wherein each electromagnet has a winding or a coil of metal, e.g., copper, wherein a current is passed through the winding or coil made of wire, for example, for the operation of the electric machine. In this case, one of the two components, i.e. either the inner component or the outer component, or the rotor or the stator, comprises the electromagnets as components, and the other of the two components, i.e., either the outer component or the inner component, or the stator or the rotor, comprises the permanent magnets as components. During operation, the component designed as a rotor rotates relative to the component designed as a stator, so that the electromagnets as components of the one of the two components also rotate relative to the permanent magnets as components of the other of the two components.

Usually, the inner component has a plurality of electromagnets or permanent magnets as components, which are usually arranged circumferentially adjacent to each other about the central axis, wherein the at least one axially oriented channel is arranged between two directly adjacent components, i.e., electromagnets or permanent magnets. In each case two directly adjacent components are spaced apart from each other and separated by a gap. In this case the at least one channel, usually one channel each, passes through the gap between the two directly adjacent components in each case. Depending on the definition, it is also possible in this case that the gap corresponds to a channel, or that the channel is bounded or formed by the two directly adjacent components. Furthermore, the central shaft is designed as a solid shaft or as a hollow shaft. If the central shaft is hollow, it is also possible that a channel passes through the central shaft, through which channel flows air, the flow of which has been enabled by the fan. Since the inner component encloses the shaft, the shaft also passes through the inner component, wherein a channel running through the in particular hollow shaft also passes through the inner component.

The guide vanes of the fan and/or of the turbine can usually rotate in a synchronous manner with the rotor as an inner component and the central shaft and are thus driven automatically. If the stator as an inner component is enclosed by the rotor as an outer component, it is provided in this case to mechanically connect or couple in particular the guide vanes of the turbine with the rotor as an outer component. The guide vanes of the fan may also be independent of the rotor.

In one embodiment, it is provided that the turbine is designed as part of the rotor, if said rotor represents the inner component, or as part of a geometry of the rotor. In this case the turbine is usually integrated in a front plate or end plate of the rotor. Usually, such an end plate is provided at axial ends of the rotor in each case and furthermore arranged and/or mounted at the ends of the components, i.e, for example, of the electromagnets, of the rotor. In this case, it is also possible that a respective end plate is arranged at ends of a stack of sheets of a respective electromagnet of the rotor, wherein, in each case, such a stack of sheets is designed as a part of the respective electromagnet, wherein a winding of such an electromagnet encloses at least one stack of sheets. The end plates enable, e.g., a bracing of the stack of sheets and a guiding of the winding at a deflection of, e.g., 180° or 360°. In addition, a balancing of the inner component, e.g., of the rotor, is also possible with the end plates. The fan is usually arranged on an end face of the rotor, which end face is opposite to the end face in which the turbine is integrated.

In addition, it is provided that the fan and the turbine each have guide vanes as air guiding elements. In this case, air guiding elements of the fan are designed to convey the air in the axial direction, i.e. parallel to the central axis through the at least one channel to the turbine at the other end of the channel or to the end face opposite of the fan. Air guiding elements of the turbine are set in rotation by inflowing air from the at least one channel. The air guiding elements of the turbine and/or of the fan are integrated in a respective end plate depending on the design and/or intended manufacturing concept.

By means of air guiding elements, for example guide vanes of the turbine, rotation energy is taken from the air flowing through the at least one channel, wherein in one embodiment a rotationally flowing portion of this flowing air is deflected in the opposite direction from a rotation direction of the rotating component or the rotor. Thus, overall a swirling portion of the flowing air exiting the at least one channel is reduced.

In one embodiment of the system, e.g., a plurality of channels for the flowing air passes through the inner component, which channels are distributed regularly and/or symmetrically about the central axis of the inner component, which also passes through the central shaft. If the inner component has n components, e.g., n=6, i.e. electromagnets or permanent magnets, it is possible that n channels corresponding to the n gaps, which are formed between the adjacent n components, or in the case of electromagnets between the adjacent n windings, pass through the inner component.

In one embodiment, the air guiding elements of the turbine and/or of the fan are mechanically connected and/or coupled to the component designed as a rotor. Usually, the air guiding elements of the turbine and the rotor are permanently or rigidly connected to each other.

The guide vanes of the fan are designed to generate a flow of the air, which flow is directed in a direction parallel or axial to the central axis and which can flow through the axial channel, e.g. cooling channel. The axially flowing air flow in this case usually has a high rotation speed (swirl), which is, when the axial flow or the axial flow of the air impinges on the turbine or the guide vanes thereof arranged on the opposite side of the cooling channel, converted, preferably completely, into rotation energy of the rotor.

The electric machine according to the invention has a rotor and a stator as components and an embodiment of the system according to the invention.

In a possible embodiment, the electric machine is designed as an asynchronous machine or a current energized synchronous machine. The electric machine is operated either as a motor or as a generator, wherein the respective operating mode of the electric machine is irrelevant for a respective embodiment of the system and the method described below, wherein the method can be performed independent of whether the electric machine is operated as a motor or as a generator. Furthermore, it is possible for the electric machine to be arranged in a vehicle designed, e.g., as a motor vehicle, and designed to convert electrical energy into mechanical energy for driving or moving the vehicle, but also vice versa, to convert mechanical energy into electrical energy.

The method according to the invention is provided for cooling an electric machine having two components which are symmetrical to a central axis of the electric machine, wherein one of the two components is designed as a rotor and the other as a stator. At least one axially oriented channel as a flow channel and/or cooling channel will pass or passes through at least one of the two components. A fan will be or is arranged at a first end of the at least one channel, wherein a turbine will be or is arranged at a second end of the at least one channel. The fan enables the air to flow, flowing from the first end through the at least one axially oriented channel to the second end. By means of the turbine, kinetic energy of the flowing air, in particular rotation energy of the flowing air, is converted into rotation energy of the component designed as a rotor.

With the method presented and the system presented, wherein an embodiment of the method is usually carried out with an embodiment of the system, it is possible to better cool an electric machine designed, for example, as an electric drive machine. In this case, in particular the rotor, but depending on the embodiment or design of the electric machine, also the stator must be cooled, in which case air cooling is realized by a combination of fan and turbine according to the invention.

A cooling which can be realized with the method and/or the system or a correspondingly realizable cooling is, with respect to power loss, and thus with respect to efficiency, but also with respect to the cooling effect and thus with respect to continuous performance, an optimized cooling, e.g. an optimized form of a recirculating air cooling, wherein the air in one embodiment flows through a plurality of axial channels, through the inner component, and optionally, also through the central shaft, if this central shaft is hollow.

In this case, a usually axial fan is positioned at an axial end and/or an axial side, e.g., an end face, of the inner component designed as a rotor, for example, and an axial turbine, for example is arranged at an opposite end or on an opposite side, in particular an end face, of the inner component designed as a rotor, for example. In this case it is possible to integrate the fan and/or the turbine in a respective side or end face of the rotor. In this case it is provided that a usually high rotation speed or a swirl of the axially flowing air or of an axially flowing air mass flow is transformed or converted into rotation energy of the rotor by the turbine. In terms of an ideal hydraulic efficiency of the fan and the turbine, any additional losses due to such a cooling, e.g. a recirculating air cooling, correspond only to pressure losses of a non-rotating flow of the air through the axial or axially oriented channels, wherein any such potential losses are comparatively low. Also, when taking into account a real degree of efficiency to be achieved, the system presented and the method presented offer the possibility of a good cooling effect by the air due to a comparatively high axially oriented velocity of the air flowing through the channels, which can be achieved with relatively little increase in power loss.

Thus, with the method and the system, efficient cooling with comparatively little additional hydraulic losses can be achieved. Furthermore, a usually complex and error-prone cooling of the inner component by a liquid can be omitted. Compared to conventional implementations, therefore, losses, especially at high speeds of the electric machine, can be substantially reduced.

It is usually provided that the guide vanes of the fan, which may be, for example, an axial fan, and the guide vanes of the turbine are coordinated with each other. Air, which is drawn in by the fan and blown out again, flows axially through the at least one channel. Due to the rotation of the guide vanes of the fan the air blown out and flowing through the channel air has a swirl. The flowing air has kinetic energy, which has a proportion of axial kinetic energy due to an axial flow of the air, and a proportion of rotational kinetic energy or rotation energy due to the swirl of the air. In particular, it is this rotation energy as a proportion of the kinetic energy which is converted into rotation energy of the rotor due to the shape of the guide vanes of the turbine so that the air as it exits the turbine flows substantially axially only without swirl or flows away.

It is understood that the features mentioned above and those yet to be explained below can be used not only in the respectively specified combination but also in other combinations or alone, without departing from the scope of the present invention.

The invention is schematically illustrated in the drawings by means of embodiments and will be described schematically and in detail with reference to the drawings.

DETAILED DESCRIPTION

Figure 1:
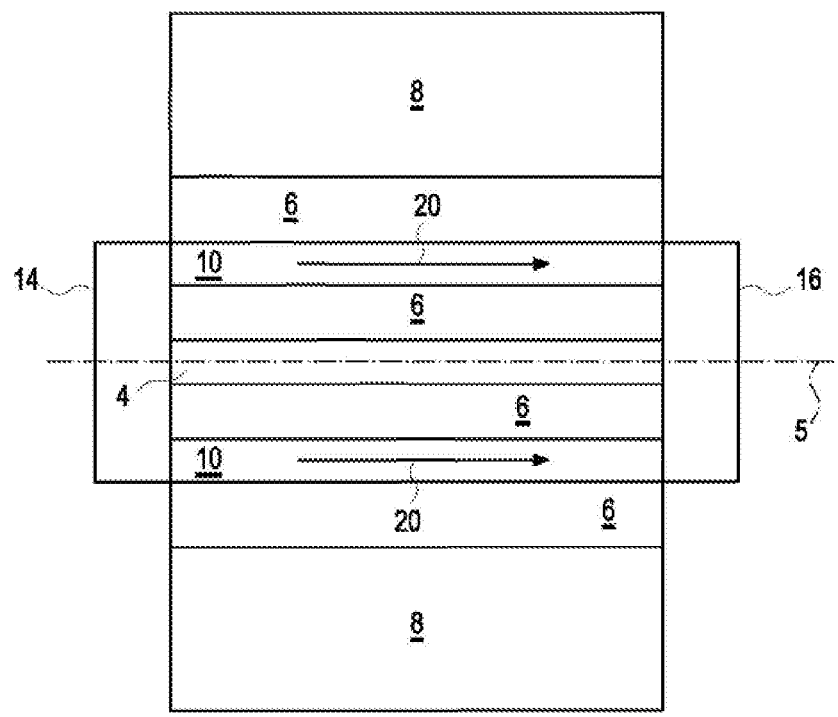
FIG. 1 shows a schematic representation of a first embodiment of the electric machine according to the invention and a first embodiment of the system according to the invention when carrying out a first embodiment of the method according to the invention.

The figures will be described coherently and comprehensively. Same components are assigned the same reference numerals.

The embodiment of the electric machine according to the invention schematically illustrated in FIG. 1 has here a central shaft 4 and a rotor 6 as an inner component, and a stator 8 as an outer component.

In this case, shaft 4, rotor 6 and stator 8 are arranged coaxially with respect to a central axis 5 of the electric machine. In addition, it is provided here that a plurality of axially oriented channels 10 pass through rotor 6, which channels are arranged in a regularly distributed manner about axis 5. Rotor 6 and shaft 4 are connected to each other in a mechanically fixed manner.

In an operation of the electric machine, rotor 6 rotates with shaft 4 relative to fixed stator 8 around axis 5 within a cylindrical space enclosed by stator 8.

The embodiment of the system according to the invention for cooling the electric machine is assigned to this electric machine, wherein the electric machine depending on the definition includes the system. In this case, the system has, in addition to the axial channels 10 within rotor 6, a fan 14 and a turbine 16.

In this case it is provided that guide vanes, not illustrated further, as air guiding elements of fan 14 are mechanically coupled or connected to rotor 6. In addition, guide vanes, not illustrated further, are coupled and or connected to rotor 6 as air guiding elements of turbine 16.

In the presented embodiment of the method according to the invention it is provided during an operation of the electric machine that guide vanes of fan 14 are set in rotation, wherein air is drawn from the outside by the rotating or turning guide vanes of fan 14 and conveyed in the axial direction parallel to axis 5 through channels 10, wherein the air flows through channels 10, which is indicated here by arrows 20. This air flowing in an axial direction impinges on guide vanes of turbine 16, which are also set in rotation by the flowing air, wherein the kinetic energy of the flowing air is first converted into rotation energy of turbine 16 or of the guide vanes of turbine 16. Furthermore, this rotation energy of turbine 16, in particular of the guide vanes of turbine 16, is converted into rotation energy of the components designed as rotor 6.

In the embodiment of the method, the air flowing through channels 10 is deflected by air guiding elements of turbine 16 or in turbine 16 counter to a direction of rotation of rotor 6, whereby rotation energy is taken from the flowing by air guiding elements of turbine 16. Thus, a swirling proportion of the flowing air exiting channels 10 is reduced in the system. In the embodiment of the method presented here, a rotational speed of turbine 16 also corresponds to a rotational speed of rotor 6, with the swirling proportion of the flowing air rotating like rotor 6. If the flowing air is deflected at the exit counter to the direction of rotation, pressure differences arise on the air guiding elements of turbine 16 that can cause an acceleration of rotor 6.

Figure 2:
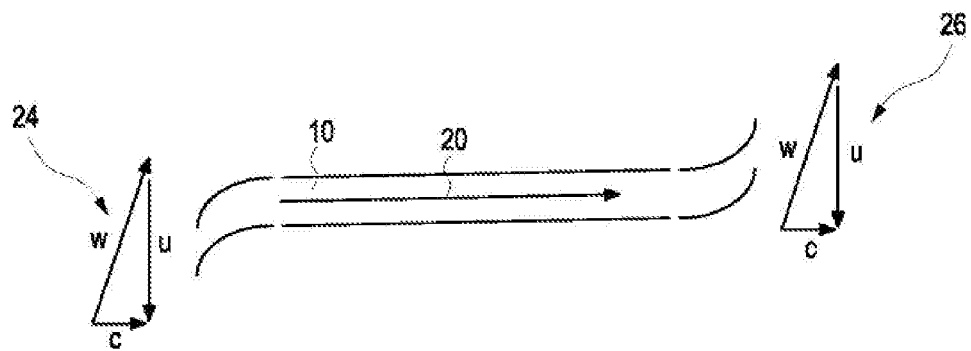
FIG. 2 shows a schematic representation of a detail of the system of FIG. 1.

FIG. 2 shows, as a detail of FIG. 1, an axially oriented channel 10 and arrow 20, in the direction of which in the embodiment of the method the air flows through channel 10 in an axial direction. In addition, FIG. 2 shows a first velocity diagram 24, which describes an operating principle of the guide vanes of fan 14, and a second velocity diagram 26, which describes an operating principle of the guide vanes of turbine 16. Each of the two velocity diagrams 24, 26 comprises a first vector u, which indicates a circumferential velocity of the guide vanes of fan 14 or of turbine 16, a second vector w, which indicates a relative velocity of the guide vanes of fan 14 or of turbine 16, and a third vector c which indicates or shows an absolute velocity of the guide vanes of fan 14 or of turbine 16.

In this case it is provided that a design of fan 14, in particular of its guide vanes, and a design of turbine 16, in particular its guide vanes, are coordinated with each other. By such coordination, an axial volume flow of the air flowing through axial, usually rotating, channels 10 can be controlled. With such a design of fan 14 and of turbine 16 a wide band or a wide area for a rotational speed with which the electric machine is operated is taken into account. This band is limited for the rotational speed by a maximum possible rotational speed and optionally by a minimum possible rotational speed. This takes into account that at higher rotational speeds, increased cooling is needed. In this case, it is furthermore possible to design fan 14 and turbine 16 for a high rotational speed. At a lower rotational speed of the electric machine a lower conveying effect with which the air is conveyed from fan 14 through channels 10, is usually uncritical and possibly even advantageous in terms of any losses. The guide vanes of fan 14 and of turbine 16 are in each case integrated into an axial end plate or end face of rotor 6. The guide vanes of fan 14 and/or of turbine 16 are designed so that in an outflow of the flowing air from the electric machine substantially pure axial flow components are present.

A rotational speed or turning velocity or rotational velocity of the guiding elements of turbine 16, which are designed as guide vanes, corresponds to the turning velocity of rotor 6. In this case it is, for example, possible that the air guiding elements of turbine 16, depending on the definition, are designed as parts of rotor 6. A shape of the air guiding elements is adjustable or selectable depending on operating parameters of the system and depends, for example, on an intended axial flow or volume flow of the air as a fluid through channels 10 and the rotational speed, with such operating parameters defining inlet angle and exit angle of the air guiding elements. For this purpose the Euler turbine equation used in an embodiment is provided below as an example:

$$Y = v_2 * c_{v2} - v_1 * c_{v1}$$

Here, Y is a specific work of the air guiding elements, i.e. the specific blade work or guiding blade work. $v_1$ is the circumferential velocity of a rotating air guiding element at an entrance of the turbine and $v_2$ is the circumferential velocity at an exit of turbine 16. $c_{v1}$ is a circumferential component of a fluid velocity at the inlet of turbine 16 and $c_{v2}$ is the circumferential component of the fluid velocity at the exit of turbine 16. In an ideal swirl-free flow or outflow of air $c_{v2}=0$ applies, resulting in a larger negative specific blade work Y. If the blade work Y is negative, an accelerating torque is transmitted from turbine 16 to rotor 6.

With the system presented, it is possible to recover kinetic energy of the swirling air flowing through channels 10 and rotor 6 by turbine 16 which, for example is integrated into rotor 6, and to convert said kinetic energy into rotation energy of rotor 6. Coordinating the design of the guide vanes of fan 14 and the design of the guide vanes of turbine 16 achieves for the air flowing through channel 10, which swirls and thus has rotation energy, that air flowing off or out of turbine 16 is almost without swirl because its rotation energy is converted into rotation energy of rotor 6.

In this case, a part, e.g. 50%, of the energy or power consumed by fan 14 is recovered by turbine 16, whereby the efficiency of cooling is increased by the air. In this case, swirl is removed from the flowing air and rotor 6 is accelerated.

Figure 3:
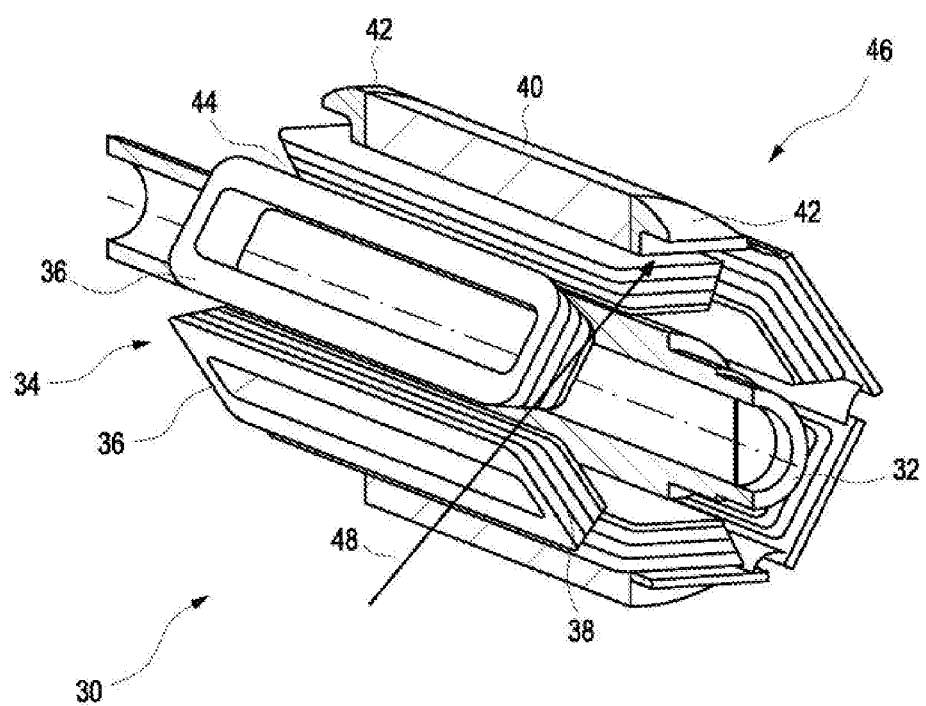
FIG. 3 shows a schematic representation of a detail of a second embodiment of the electric machine according to the invention and a detail of a second embodiment of the system according to the invention for carrying out a second embodiment of the method according to the invention.

The detail of the electric machine 30 shown in FIG. 3 comprises a central shaft 32, which is enclosed by a rotor 34 as an inner component of electric machine 30. In this case, rotor 34 comprises a plurality of components, here six, which are designed as electromagnets 36, wherein in each case an electromagnet 36 has a winding 38 made of copper. In addition, rotor 34 or its electromagnets 36 is or are enclosed by a housing 40, at the two axial ends of which an end plate 42 is arranged in each case. FIG. 3 also shows that in each case two directly adjacent electromagnets 36 are spaced apart from each other, wherein between each two directly adjacent electromagnets 36 there is a gap, which is designed and/or used as the channel 44 of the third embodiment of the system 46 according to the invention.

Overall, rotor 34 here comprises six gaps between six electromagnets 36 and thus also six channels 44 passing through or traversing rotor 34. For the sake of better clarity, a turbine and a fan are not explicitly shown in FIG. 3 as further components of system 46. However, in FIG. 3 an arrow 48 indicates a possible position of an air guiding element of the turbine or the fan, wherein in each case an air guiding element, e.g. an air guide vane, is integrated at this position or point in the section of the end plate 42. In this case, at a first end of rotor 34 or at first ends of air guiding channels 44 guide vanes of the fan, and at opposite second ends of rotor 34 and channels 44 air guiding elements of the turbine, are integrated into the respective end plate 42. Both the channels 44 and the air guiding elements of the turbine or of the fan which are integrated in a respective end plate 42 rotate at the same velocity as rotor 34. Being fully integrated with rotor 34, they are mechanically rigidly coupled to rotor 34.

REFERENCE NUMERALS 4 shaft
5 axis
6 rotor
8 stator
10 channel
14 fan
16 turbine
20 arrow
24, 26 vector diagram
30 electric machine
32 shaft
34 rotor
36 electromagnet
38 winding
40 housing
42 end plate
44 channel
46 system
48 arrow

The invention claimed is:

1. A system for cooling an electric machine, comprising;
two components, one of the two components being a rotor and the other a stator, the two components enclosing a central axis of the electric machine coaxially, wherein during operation of the electric machine, the rotor rotates relative to the stator, wherein at least one axially oriented channel passes through at least one component, wherein a fan is arranged at a first end of the at least one channel, wherein a turbine is integrated on an end plate at a second end of the at least one channel, wherein the fan directs air to flow in a single axial direction from the first end through the at least one axially oriented channel to the second end to initiate a rotation of the turbine, wherein the turbine converts kinetic energy of the flowing air into rotation energy of the rotor and the flowing air exits the turbine in the axial direction substantially parallel to the central axis.

2. The system according to claim 1, wherein the at least one axially oriented channel passes through the rotor.

3. The system according to claim 1, wherein one of the two components has a plurality of electromagnets, wherein the at least one axially oriented channel is arranged between two directly adjacent electromagnets.

4. The system according to claim 1, wherein the fan and the turbine each have air baffles, wherein the air baffles of the turbine are connected with the rotor.

5. The system according to claim 4, wherein the air baffles of the turbine are integrated in an end plate which is arranged at one end of the rotor.

6. The system according to claim 4, wherein the air baffles of the fan are designed to enable air to flow in an axially directed flow.

7. A method of cooling an electric machine having two components, one of the two components being designed in the form of a rotor and the other in the form of a stator, the two components enclosing a central axis of the electric machine coaxially, wherein during operation of the electric machine, the rotor rotates relative to the stator, wherein at least one axially oriented channel passes through at least one component, wherein a fan is arranged at a first end of the at least one channel, wherein a turbine is integrated on an end plate at a second end of the at least one channel, wherein the fan directs air to flow in a single axial direction from the first end through the at least one axially oriented channel to the second end to initiate a rotation of the turbine, wherein the turbine converts kinetic energy of the flowing air into rotation energy of the component designed as a rotor and the flowing air exits the turbine in the axial direction substantially parallel to the central axis.

* * * * *